UNITED STATES PATENT OFFICE.

ORAZIO LUGO, OF BALTIMORE, MARYLAND.

IMPROVEMENT IN FERTILIZERS OR FISH-GUANO.

Specification forming part of Letters Patent No. 99,452, dated February 1, 1870.

*To all whom it may concern:*

Be it known that I, ORAZIO LUGO, of Baltimore, in the county of Baltimore, and in the State of Maryland, have invented a new and useful Improvement in Fertilizers, or Artificial Guano from Fish; and I do hereby declare that the following is a full, clear, and exact description thereof.

This invention consists in preparing from fish a pulverulent material, very rich in nitrogenized substances, and which, when used as a fertilizer or compounded with other materials, will evolve a large percentage of ammonia, much larger than similar fish-products as heretofore prepared.

I take the fish and treat them so as to dry them thoroughly before decomposition sets in. It is well known that fish begin to undergo putrefactive fermentation soon after they are dead, and the result of this fermentation is a loss of ammonia—that fertilizing principle which is the chief object sought in fish and other guanos. Besides, after this fermentation has set in, it is difficult to arrest; and, even if arrested by thorough drying, it is easily started again by slight moisture. Therefore there is constant loss of ammonia after manufacture.

It is the object of my invention to secure in the compound all the nitrogenized substances contained in the fish, and in a form easily preserved for any length of time.

The following description will enable any one skilled in the art to manufacture my improved fertilizer or artificial fish-guano.

I take any suitable fish, such as commonly used for manuring, and, as soon as possible after they are caught, place them in a shed, kiln, or building, on trays, hurdles, lattice-work, or wire screens, so as pass through them either hot air, or, what I prefer, the gaseous products of combustion, so as to dry them without scorching or roasting them.

I begin with a gentle heat, say about 140° Fahrenheit, and gradually increase it, so that at the end of about three hours it will reach a temperature of about 250°. This will gradually expel all moisture, and leave the fish in a suitable condition to be ground into a meal or powder.

This powder will be a good artificial guano, and may be used either alone or with other materials in compounding fertilizers. By combining it with Navassa guano, bone-dust, or mineral phosphates, these will be fully "ammoniated." It may also be composted with peat, clay, oxide of iron, plaster, furnace-slag, cinders, and any of the materials used in making fertilizing compounds. It will thoroughly ammoniate all such materials, and render them quite similar to the best Peruvian guano; or the material may be packed in bags, boxes, or casks, so as to be kept dry, and in that condition sold at once to the farmers, to be applied directly to the soil, or used in preparing composts.

Any suitable construction of kiln or drying apparatus may be employed, if supplied with proper devices for controlling the temperature.

I am well aware that fertilizers have been prepared by drying the pomace or marc of fish from which the oil has been extracted; but all such preparations are inferior to mine in the amount and in the permanency of the nitrogenized or ammonia-producing elements.

Having described my invention, what I claim, and desire to secure by Letters Patent of the United States, is—

1. The improved fertilizer or guano, prepared by treating fish by the process herein described, so as to obtain the maximum amount of nitrogenized materials, as set forth.

2. The compound fertilizers produced by combining the highly-nitrogenized product herein described with phosphates, plaster, or with either or all of the other substances, as above set forth.

ORAZIO LUGO.

Witnesses:
EDM. F. BROWN,
C. BESTOR.